Feb. 27, 1951     H. A. MEINECKE     2,543,584
VARIABLE SPEED TRANSMISSION
Filed June 3, 1944     5 Sheets-Sheet 1
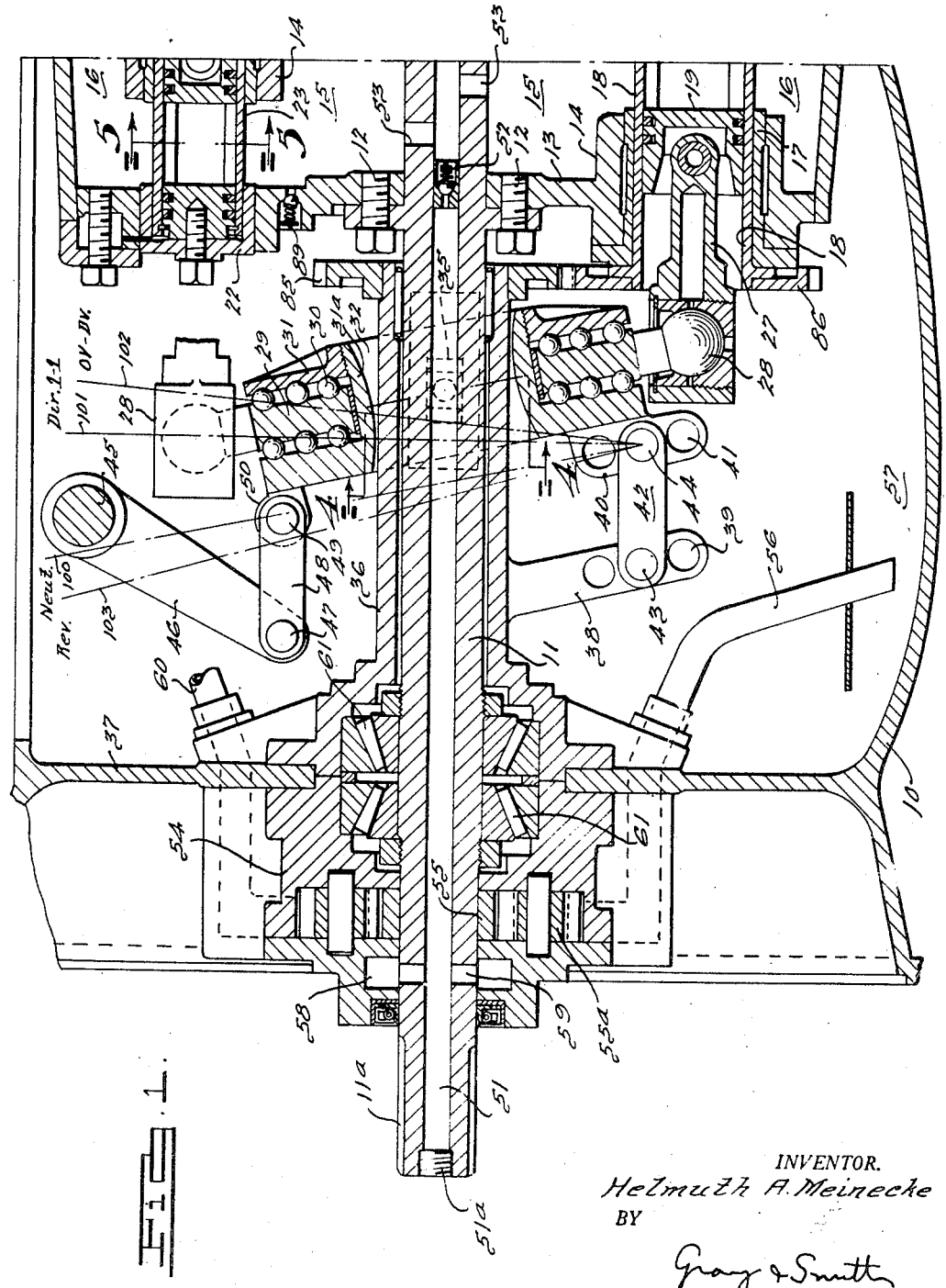
INVENTOR.
Helmuth A. Meinecke
BY
Gray & Smith
ATTORNEYS.

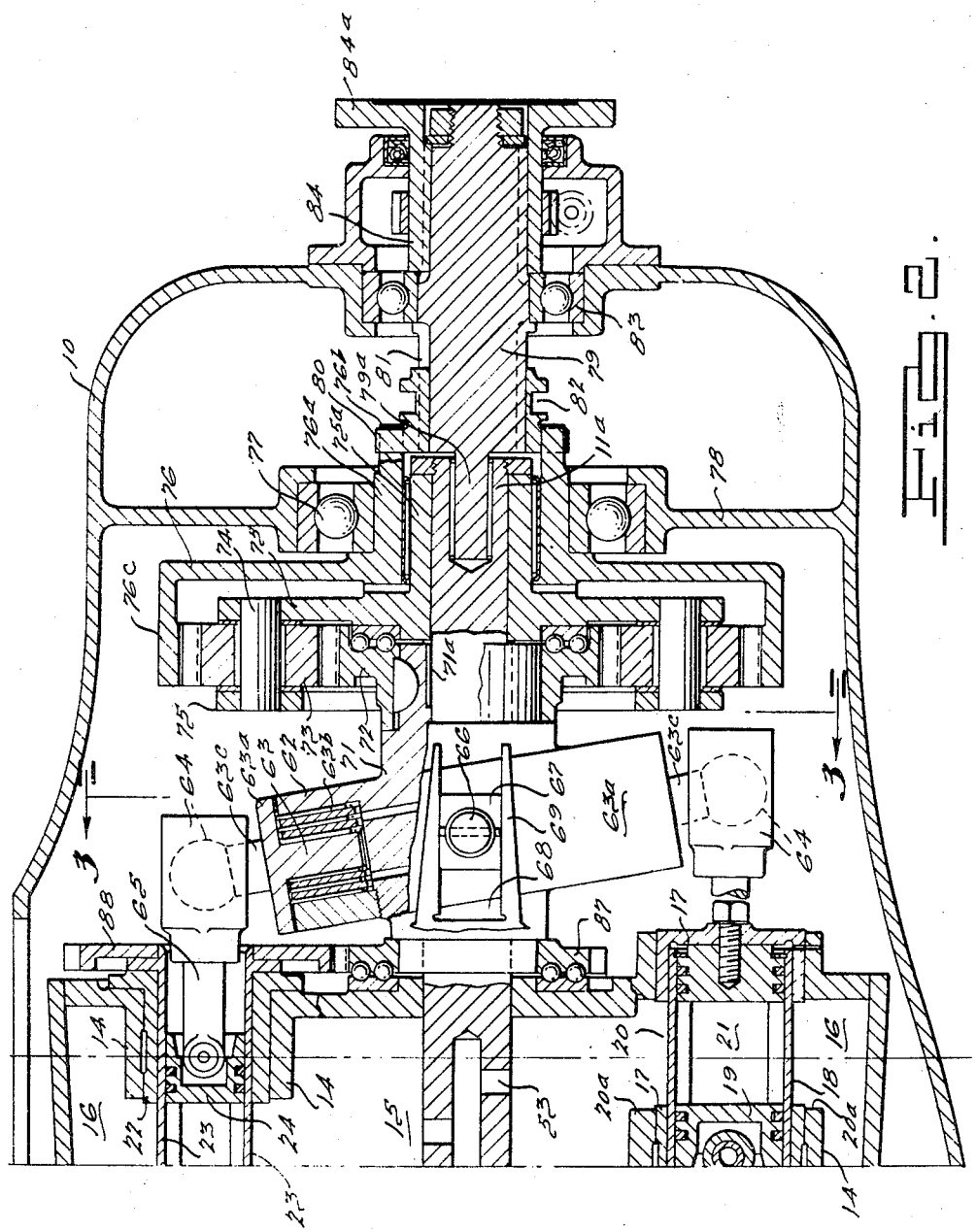

Feb. 27, 1951     H. A. MEINECKE     2,543,584
VARIABLE SPEED TRANSMISSION
Filed June 3, 1944     5 Sheets-Sheet 3
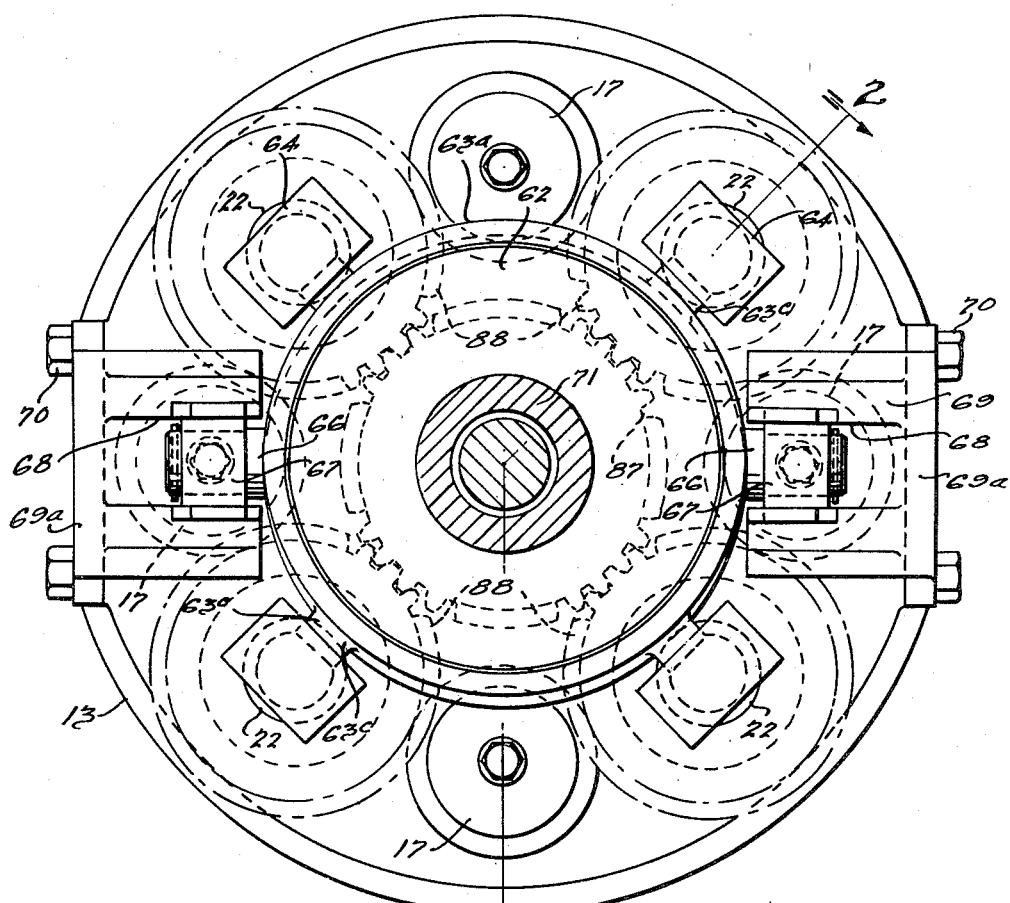
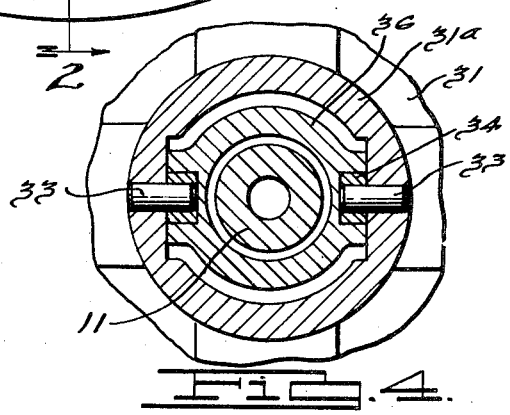
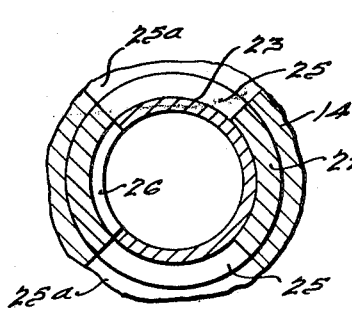
INVENTOR.
Helmuth A. Meinecke.
BY
*Grey & Smith*
ATTORNEYS.

Feb. 27, 1951 H. A. MEINECKE 2,543,584
VARIABLE SPEED TRANSMISSION
Filed June 3, 1944 5 Sheets-Sheet 4
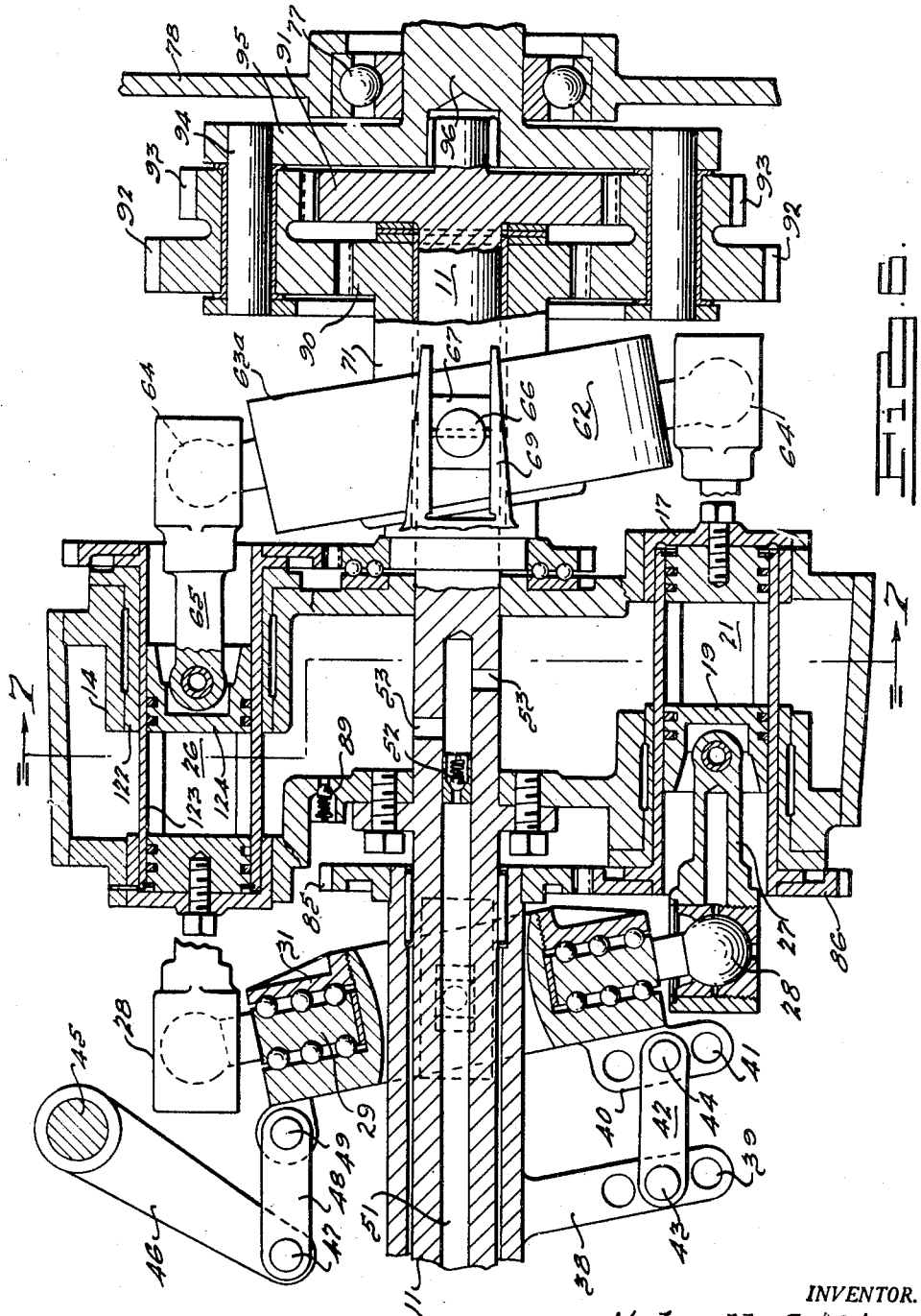
INVENTOR.
Helmuth A. Meinecke.
BY
Gray & Smith
ATTORNEYS.

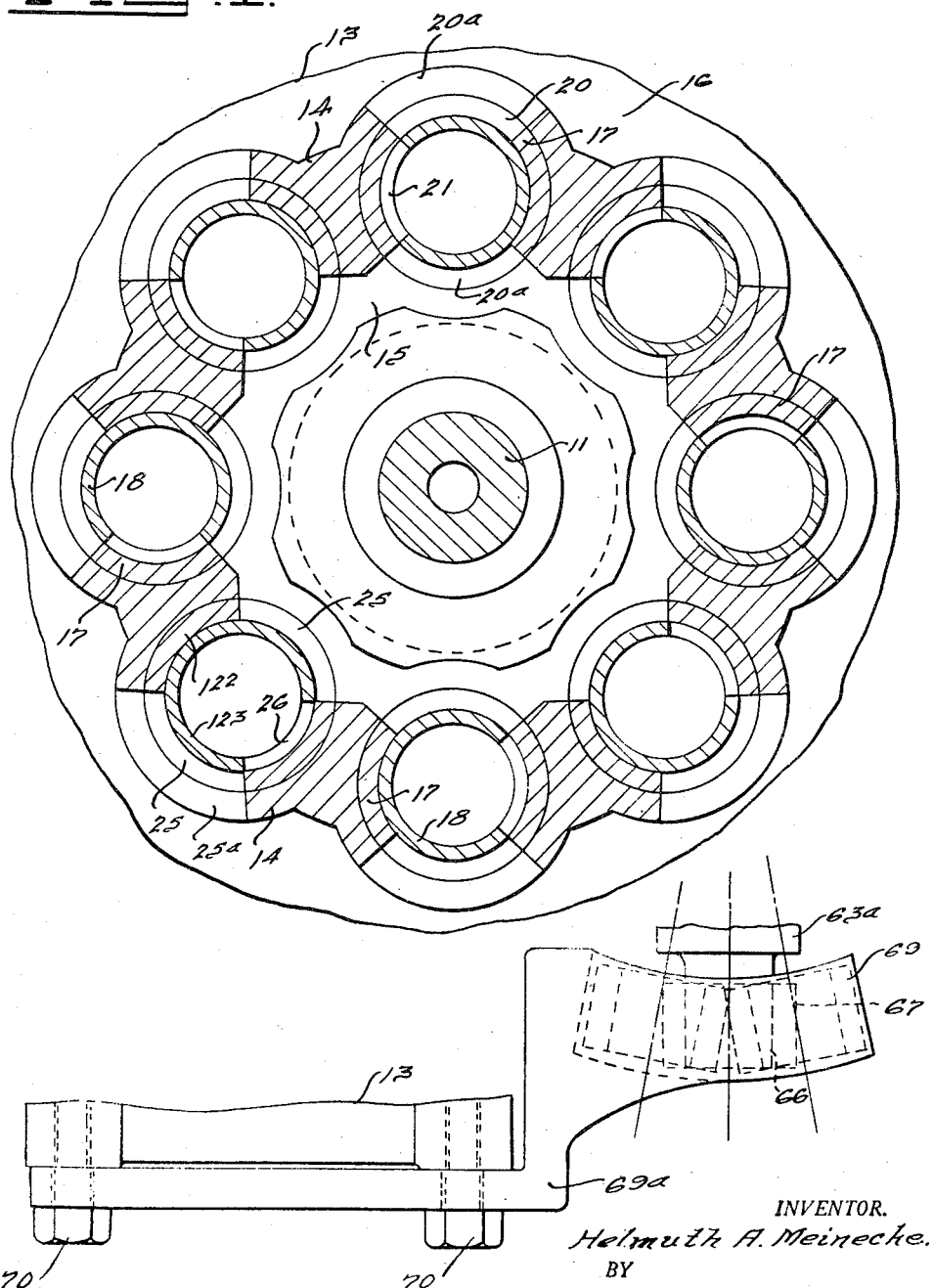

Patented Feb. 27, 1951

2,543,584

UNITED STATES PATENT OFFICE 2,543,584

VARIABLE SPEED TRANSMISSION

Helmuth A. Meinecke, Grosse Pointe, Mich.

Application June 3, 1944, Serial No. 538,576

41 Claims. (Cl. 74—687)

This invention relates to variable speed transmissions and more particularly to transmissions of the torque convertor class in which torque multiplication and variation in speed ratios between a driving element and a driven element under variable load conditions is accomplished automatically without the use of gear shifting or change gear mechanism.

An object of the invention is to provide a torque multiplying transmission in which a hydraulic unit is interposed between driving and driven elements which is positive in action under all operating conditions and through which the torque reaction is transmitted to a fixed or stationary element or structure independent of the driving element.

A further object of the invention is to provide an improved variable speed transmission having improved mechanism for controlling the speed ratio and torque multiplication between driving and driven elements, such as power input and output shafts, which mechanism will be efficient and durable in operation and substantially positive in action, the improved construction being such that a range of torque multiplication and speed reduction may be obtained, without the interposition of conventional clutch and change gear mechanism. By virtue of the invention, therefore, a transmission is provided by which all speed ratios may be progressively obtained from zero to direct drive and also overdrive without the necessity of selectively shifting gears to obtain different speed ratios.

A still further object of the invention is to provide a torque multiplying transmission of improved construction in which under all operating conditions, when under normal torque, the transmission positively tends to revert to neutral when under load regardless of whether the direction of drive is forward or reverse.

Another object of the invention is to provide an improved torque multiplying transmission in which the speed ratio between the input and output shafts is governed by control mechanism of the fluid or hydraulic type capable of functioning under reverse torque as well as normal torque conditions.

Still another object of the invention is to provide a transmission in which torque multiplication or conversion is obtained through a single set of constantly meshing gears, such as a set of epicyclic or planetary gears, by the provision of a fluid or hydraulically controlled unit operative to control the reaction gear of the set and the further provision of a fixed or stationary means for absorbing the torque reaction transmitted from the reaction gear through the fluid or hydraulically controlled unit.

A further object of the invention is to provide a transmission of the foregoing kind in which the fluid or hydraulic unit for controlling the torque transmitting characteristics of the train of epicyclic or planetary gears comprises a positive acting piston type pump embodying two groups of pistons and cylinders, the relative fluid displacement of which may be controlled thereby controlling the transmission of torque from the input shaft through the gear train to the output shaft.

Still a further object of the invention is to provide a transmission of the foregoing kind in which two groups of pistons and cylinders are mounted in common in a single housing rotatable with the input shaft, the stroke and hence the volumetric displacement of one group of pistons being varied by an angularly adjustable wobbler member thereby varying proportionately the volumetric displacement but not the stroke of the other group of pistons which, having a constant stroke, consequently control the torque transmitting characteristics of a set of gears through the medium of a fixed angle wobbler member secured to the reaction gear of the set.

Another object of the invention is to provide an improved hydraulic control unit for a torque multiplying transmission comprising two variable displacement piston pumps rotatable as a unit with the driving element or input shaft, the relative displacement thereof being governed by a variable angle wobbler member and a fixed angle wobbler member, the latter controlling the reaction gear of a constantly meshing set of gears in such manner as to provide, as desired, a neutral condition of the transmission, and progressively changing speed ratios in reverse drive, forward drive and overdrive. The improved construction not only accomplishes the foregoing important functions but also is such that the entire hydraulic control unit including the gearing and fluid medium is immobilized in direct drive.

It is a further object of the invention to mount the variable angle wobbler member on a stationary part of the transmission case for absorption of the torque reaction and in such manner that under normal torque conditions when operating in either a forward or reverse direction the pressure, either positive or negative, existing in the hydraulic unit at all times tends to move the wobbler member into the neutral position. By virtue of this important tendency of the variable angle or adjustable wobbler member to revert to its neutral position thereby returning the transmission to neutral, it is possible pursuant to the present invention to utilize this feature in providing control mechanism associated with and coacting with this wobbler member for varying the relative displacement of the hydraulic pump elements and thereby the speed ratio under varying load conditions.

Another object of the invention is to provide a hydraulic pump unit for a torque multiplying transmission having (1) improved means for circulating, cooling and replenishing the oil as well as compensating for expansion and contraction thereof; (2) improved construction and arrangement of the pumping elements providing a relatively simple and compact mechanism; (3) improved valve mechanism having free and unobstructed ports equal in area to the area of the pistons so as to permit a free flow of the oil or fluid medium throughout the system thereby reducing heat generation and consequent loss of power; and (4) opposed sets of variable displacement and fixed displacement pumping elements which are positive in action under all operating conditions.

Still another object of the invention is to provide a more efficient variable speed hydraulically controlled transmission capable of sustained high speed operation at or near a one to one ratio as well as low speed operation at a low ratio with full throttle under severe load conditions without failure or destruction of the fluid medium due to overheating resulting in the breakdown of the transmission.

It is also an important object of the invention to provide a torque multiplying transmission capable of automatically providing neutral, reverse, forward and overdrive positions, in which the fluid or hydraulic torque converting mechanism will be immobilized in direct drive with a one to one ratio, and in which the transmission if unrestrained will rapidly and smoothly return to neutral.

Other objects of this invention will appear in the following description and appended claims, reference being had to the accompanying drawings forming a part of this specification wherein like reference characters designate corresponding parts in the several views.

Fig. 1 is a longitudinal section taken through the front portion of the transmission.

Fig. 2 is a similar view partly in elevation taken through the rear portion of the transmission, this view in conjunction with Fig. 1 illustrating in section the entire transmission with the exception of the control mechanism and being taken substantially through lines 2—2 of Fig. 3.

Fig. 3 is a transverse vertical section taken substantially through lines 3—3 of Fig. 2 looking in the direction of the arrows.

Fig. 4 is a section taken substantially through lines 4—4 of Fig. 1 looking in the direction of the arrows.

Fig. 5 is an enlarged section taken substantially through lines 5—5 of Fig. 1 looking in the direction of the arrows.

Fig. 6 is a sectional view on a reduced scale, similar to Figs. 1 and 2 when combined, illustrating another embodiment of the invention.

Fig. 7 is a section taken substantially through lines 7—7 of Fig. 6 looking in the direction of the arrows.

Fig. 8 is a fragmentary plan view showing the anchoring means for the fixed angle wobbler assembly, similar means being provided for the adjustable or variable angle wobbler although omitted for the sake of clearance.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present transmission in general comprises a cylindrical pump housing rigidly secured to the driving or input shaft which extends axially therethrough. Within an annular or ring-like partition wall in the housing are formed two alternately arranged series of cylinders carrying pistons reciprocable in directions parallel to the input shaft axis. The partition wall divides the housing into inner and outer chambers which are entirely separated from each other except through the medium of valve controlled ports, as a result of which one set of pistons is capable of pumping liquid from the inner chamber into the outer chamber and the other set of pistons is capable of pumping the liquid from the outer chamber back into the inner chamber.

The stroke and, hence, the volumetric displacement of one set of pistons, herein called the negative pistons, are controlled by an adjustable or variable angle wobbler assembly free on the drive shaft at the front side of the pump housing. This wobbler assembly may be adjusted angularly to vary the stroke of the negative pistons but at the same time is rigidly mounted on the stationary transmission case so as to provide a fixed point for the absorption of the torque reaction transmitted through the hydraulic pump unit.

The other set of pistons, herein termed the positive pistons, are controlled by a wobbler assembly at the rear side of the pump housing. The angularity of this wobbler assembly is fixed so that the positive set of pistons will at all times have a constant stroke although an effective displacement corresponding to that of the negative set of pistons. The wobbler assembly, which controls the positive set of pistons, is rigidly connected to the reaction gear of an epicyclic or planetary gear train which in turn governs the transmission of torque through meshing gears of the train in part secured to the driving shaft and in part secured to the driven shaft. In one embodiment of the invention the reaction gear is the sun gear of a planetary epicyclic gear train which includes a planet pinion carrier fastened to the driving shaft and an internal gear meshing with the planet pinions and drivingly connected to the driven shaft. The torque transmission in this instance is from the input shaft to the planet pinion carrier and thence to the planet pinions. The planet pinions apply torque to both the sun gear and the internal gear, the torque thus being split equally at this point when the transmission is in neutral. In another embodiment of the invention, wherein a so-called compound planetary gear train is substituted for the epicyclic gear train, the driving gear fastened to the drive shaft is connected to the reaction gear by a series of compound planet pinions mounted on a pinion carrier drivingly connected to the driven or output shaft. The torque transmission in this instance is from the driving gear through the planet pinions where the torque is split and transmitted to the planet pinion carrier at one side and to the reaction gear at the other side.

In the embodiment utilizing the epicyclic gear train the ratio of the sun gear to the drive or input shaft is three to one, when the transmission is in neutral, and consequently in this embodiment the negative pistons have twice the displacement of the positive pistons thereby necessitating two reciprocating cycles of the positive set of pistons for each cycle of operation of the negative set of pistons. In the embodiment utilizing the compound planetary gear train a two to one ratio is obtained between the reaction gear and the drive shaft, and hence the negative and positive sets of pistons are all of the same diameters with equal displacements. Therefore, with this construction the positive pistons complete one reciprocating cycle as the negative pistons complete one reciprocating cycle when the transmission is in neutral.

The variable angle wobbler assembly is biased or unbalanced toward the neutral position, that is, the assembly or unit is pivotally mounted on a fixed part of the casing off-center with respect to the axis of the drive or input shaft, the arrangement being such that the pressure existing within the pump housing will at all times act on the wobbler urging it toward the neutral position. This condition exists regardless of whether the transmission is in reverse or forward drive. Consequently, a rapid and smooth return of the transmission to neutral is achieved when any force exerted against the wobbler in opposition to the pressure tending to neutralize the wobbler is not sufficient to overcome the neutralizing force.

Referring to the embodiment of the invention illustrated in Figs. 1 to 5 inclusive of the drawings, the mechanism of the present transmission is carried by a fixed or stationary transmission case 10 of suitable construction. Extending through the case 10 is an input or drive shaft 11 having splines 11a at its front end providing means for drivingly connecting the shaft 11 to a source of power such as the crankshaft of an internal combustion engine and without the interposition of any conventional clutch. Bolted at 12 to an annular flange on the input shaft 11 is a cylindrical main pump body or housing 13. The interior of the housing 13 is divided by means of a continuous annular partition or ring-like wall structure 14 into an inner low pressure chamber 15 and an outer high pressure chamber 16, this construction being substantially the same as that illustrated in Fig. 7. Spaced apart equal distances in the partition 14 are four cylindrical bores within which are fixed four cylinders 17 which are herein termed the negative cylinders of the transmission. Rotatable within each of the negative cylinders 17 is a sleeve valve 18 and within each of these valves is mounted a reciprocating piston 19. Each negative cylinder 17 is provided with two diametrically opposed ports 20 registering with similar ports 20a in the partition wall and the sleeve valve 18 which rotates within each of these cylinders is formed with a single port 21 adapted to register successively with the ports 20, 20a during rotation of the sleeve valve. The port construction in the foregoing respects corresponds to that illustrated in Fig. 5. The area of the ports 20 and 21 is the same and preferably corresponds to the area of the head of the piston 19.

The partition 14 in the cylinder block is also provided with a series of four cylinder bores within which are fixed four cylinders 22 which are herein termed the positive cylinders of the transmission. It will be noted, as seen in Fig. 3, that the cylinders 17 and 22 are arranged alternately and that in the present embodiment of the invention the bores of the cylinders 22 have one-half the effective cross-sectional displacement areas of the bores of the cylinders 17. Rotatable within each of the cylinders 22 is a sleeve valve 23 and mounted within each of these valves is a reciprocating piston 24. As in the case of the cylinders 17 and sleeve valve 18, each of the positive cylinders 22 is provided with diametrically opposed ports 25 registering with similar ports 25a in the partition wall 14, and each of the sleeve valves 23 is provided with a single port 26 adapted to register successively with the ports 25 during rotation of the valve. The port construction of the cylinders 22 and sleeve valves 23 is illustrated in Fig. 5 and it will be understood that each of the ports 25 and 26 has the same effective area as the area of the head of each of the pistons 24.

Pivotally connected to each of the negative pistons 19 is a connecting rod 27 which in turn has a ball and socket connection 28 with a rotatable wobbler plate 29. This wobbler plate is circular in construction and is provided with four equally spaced ball and socket connections 28 and four connecting rods 27 attached to the group of negative pistons 19. The wobbler plate 29 forms part of the adjustable or variable angle wobbler assembly and is rotatably mounted through the medium of suitable bearings 30 within a non-rotatable wobbler support or carrier member 31. The non-rotatable wobbler carrier 31, within which the wobbler plate 29 is free to rotate, is provided with a central hub 31a formed with a flared aperture 32 through which the input or drive shaft 11 extends. As shown in Figs. 1 and 4, the hub portion 31a carries pins 33 at diametrically opposed sides thereof which project into and are journalled within slide blocks 34 freely slidable within slideways or keyways 35 in a fixed sleeve 36 surrounding the input or drive shaft 11. Thus, as illustrated in Fig. 4, by means of the pins 33 the wobbler member 31 is trunnioned on the fixed sleeve 36 so as to permit the wobbler assembly to rock about a transverse axis normal to and intersecting the longitudinal axis of the shaft 11. However, by virtue of the slide blocks 34 the trunnion connection between the wobbler assembly and the sleeve 36 is shiftable in a direction parallel to the axis of the drive shaft.

As illustrated in Fig. 1, the front end of the sleeve 36 is flanged to abut against the front end or flange 37 of the transmission case 10, this sleeve having an annular portion fitting snugly within a central aperture in the casing flange 37 with the flange of sleeve 36 and flange 37 rigidly secured together. Fixed to and extending from the wobbler supporting sleeve 36 is an arm or bracket 38 having a number of adjusting holes 39 therein. Fastened rigidly to the non-rotatable member 31 of the wobbler assembly is a bracket 40 having a corresponding number of adjusting holes 41. The brackets 38 and 40 are pivotally connected together through the medium of a fulcrum link 42 pivoted to the brackets by pins 43 and 44. At the opposite side of the sleeve 36 is a control shaft 45, this shaft extending at right angles to the axis of the input shaft 11 and suitably journalled in the case 10. Secured to the control shaft 45 is a crank arm 46 which is pivotally connected at 47 to a link 48 pivoted at 49 to a bracket 50 secured to the non-rotatable member 31 of the wobbler assembly. The control shaft is actuated through control mechanism automatically operable from the vehicle accelerator pedal.

From this construction it will be seen that by rocking the control shaft 45 to swing the crank arm 46 the wobbler assembly will be rocked on its trunnions 33 about a movable fulcrum 44 due to the articulated connection of the fulcrum link 42 with the brackets 38 and 40. The sleeve 36, however, upon which the adjustable wobbler assembly is mounted forms in effect an extension of the transmission case and, hence, provides a means through which the torque reaction is transmitted through this wobbler assembly to the tranmission case.

The input or driving shaft 11 of the transmission is drilled longitudinally to provide an oil passage 51 plugged at its front end 51a. Mounted within this passage adjacent the cylinder housing is a spring controlled check valve 52 adapted to open under the pressure of the oil pumped through the oil passage 51. Beyond the check valve 52 the shaft is drilled to provide ports 53 effecting communication between the oil passage and the low pressure chamber 15 within the pump housing. Oil or other fluid medium is pumped through the passage 51 by means of a three gear oil pump carried by a housing 54 secured to the wall or flange 37 of the casing and also to the end wall thereof. The pump comprises a center gear 55 secured to the shaft 11 and a pair of outer gears 55a meshing therewith. Oil is drawn by the pump through an intake pipe or conduit 56 from a sump 57 in the bottom of the transmission case 10 and is discharged by the pump through an outlet conduit 58 and communicating ports 59 into the passage 51. The pump may be provided, if desired, with two inlet pipes 56 leading from the sump 57 and also, as shown in Fig. 1, with a second discharge pipe 60 leading to the hydraulic control mechanism, not shown herein. As illustrated in Fig. 1, the front main bearing for the input shaft 11 is in the form of companion tapered roller bearing races 61 supported from the wall or flange 37 of the transmission case through the medium of the front end of the fixed sleeve 36 and the adjacent end of the pump housing 54.

The group of four positive pistons 24 are controlled through the medium of a fixed angle wobbler assembly comprising a housing or carrier member 62 recessed annularly to receive a wobbler plate or disk 63 flanged at 63a over the edges of the carrier member 62, the latter being capable of rotation relatively to the wobbler disk through the medium of interposed multiple thrust washers 63b. Extending radially from the wobbler disk 63 at equally spaced intervals around the periphery thereof are studs 63c which have suitable ball and socket connections 64 with connecting rods 65 pivotally connected in conventional manner to the pistons 24. Improved anchoring means is provided for the wobbler disk 63 comprising two anchor pins 66 extending radially from the disk at diametrically opposed points, these pins being journalled in bearing blocks 67 slidingly mounted within longitudinally extending open guide slots 68 in two forked members 69 carried by brackets 69a projecting from and bolted rigidly at 70 to the main pump housing 13. It will be understood that a similar anchoring means is provided for the wobbler disk 29 which drives the negative pistons, this construction not being shown since it would merely duplicate the anchoring means for the wobbler disk 63. It will be seen from Figs. 2, 3 and 8 that the construction of the guide slots 68 is such as to permit sliding movement of the bearing blocks 67 within the guide slots in response to the motion of the wobbler plate 63 during its oscillating motion while rotating with the main pump or cylinder housing 13.

The housing or carrier member 62 for the wobbler plate 63 is integral with or rigidly secured to a sleeve 71 mounted on and concentric with the shaft 11 and freely rotatable on the shaft through the medium of suitable bearings, such as needle bearings 71a. The rear end of this sleeve 71 is reduced in diameter to receive the sun or reaction gear 72 of the epicyclic gear train, this gear being keyed to the sleeve 71 and, hence, fixed thereto. Meshing with the external teeth of the sun gear 72 are a series of planet gears 73 each of which is rotatable upon a pin or shaft 74 secured within a planet pinion gear housing 75. This housing has an integral rearwardly projecting hub 75a rigidly secured in any suitable manner to the rear end 11a of the input or driving shaft 11. The internal gear 76 of the epicyclic gear train is provided with an integral rearwardly projecting hub 76a rotatable through needle bearings on the hub 75a of the planet gear housing 75. The internal gear 76 has an annular flange 76c surrounding the planet pinions and provided with internal teeth meshing therewith. As will be seen from Fig. 2, the rear end 11a of the input shaft is supported upon a wall or flange 78 of the transmission case through the medium of the hubs 75a and 76a and a rear main bearing 77.

As illustrated in Fig. 2, the input shaft terminates adjacent the rear bearing 77 and extending in alignment or co-axially therewith is an output shaft 79 having a pilot portion 79a projecting into a centrally located hole in the end of the input shaft and journalled therein through the medium of needle bearings. The hub 76a of the internal gear 76 may be positively connected to the output shaft 79 by means of a dog clutch comprising longitudinally projecting teeth 76b on the internal gear hub adapted to mesh with radially extending teeth on a sliding clutch sleeve 80 connected by splines 81 to the shaft 79. The sleeve 80 is provided with an annular groove 82 for connection thereto of an operating fork of conventional type which may be operated to shift the clutch sleeve 80 longitudinally of the output shaft so as to engage or disengage the teeth thereof with the teeth 76b of the internal gear hub. When the dog clutch is disengaged it will be seen that the output shaft will be free to turn relatively to the input shaft independently of the hydraulic transmission. The output shaft 79 has a rear bearing 83 within a flanged aperture in the rear end of the transmission case, and keyed or splined to the output shaft is a driving sleeve 84 provided with a driving flange 84a through the medium of which power may be delivered as desired, such as to the propeller shaft connected to the rear axle of a vehicle.

Fixed to the rear end of the sleeve 36 is a stationary gear 85 meshing with a peripherally arranged series of four gears 86 secured to the rotatable sleeve valves 18 within which the negative pistons 19 reciprocate. The construction is such that during each complete revolution of the main cylinder housing or block 13, which carries the gears 86 around the stationary gear 85, the sleeve valves 18 will make one complete revolution thereby causing the port 21 in the sleeve valve to register once with each of the ports 20 in the negative cylinder 17 during such revolution. Secured to the forward end of the sleeve 71, to which the fixed angle wobbler carrier 62 is secured, is a center gear 87 meshing with a series of four peripherally arranged gears 88 fastened to the sleeve valves 23 within which the positive pistons 24 reciprocate. Thus, during each complete revolution of the positive wobbler carrier member 62 in response to rotation of the sun gear 72 the gearing 87 and 88 will cause the sleeve valves 23 to make one complete revolution thereby resulting in the port 26 in each of these sleeve valves registering once with each of the ports 25 in the corresponding positive cylinder 22. The inner low pressure chamber 15 is provided with one or more spring loaded check valves 89 adapted to open through centrifugal force developed by the fluid upon rotation of the pump housing so as to permit a constant circulation of oil for cooling purposes. Oil liberated through the valves 89 will be collected in the sump 57 and recirculated by the oil pump 55 through the conduit or passage 51 into the chamber 15. It will be understood that, during rotation of the pump housing, oil will normally be pumped by the group of positive pistons 24 from the inner low pressure chamber 15 into the outer high pressure chamber 16 and from the outer chamber will be pumped by the group of negative pistons 19 into the inner chamber. Thus, with the adjustable wobbler member 31 positioned at an angle corresponding to the neutral position of the transmission, the total displacement of the larger pistons 19 during one complete revolution of the driving shaft will be exactly twice that of the smaller pistons 24 which will, therefore, complete two cycles of reciprocation while the driving shaft and pump housing make one complete revolution. It will, therefore, be seen that in the neutral condition of the transmission one complete revolution of the drive shaft will produce one cycle of reciprocation of the larger group of pistons accompanied by two cycles of reciprocation of the smaller group of pistons, one group, therefore, balancing the other group. In this neutral condition the smaller group of pistons during their two cycles of operation will draw the same volume of oil out of the inner low pressure chamber and discharge it into the outer high pressure chamber as the volume of oil drawn by the larger group of pistons out of the high pressure chamber and discharged into the inner low pressure chamber.

The embodiment of the invention illustrated in Figs. 6 and 7 corresponds in all respects to the previous embodiment with the exception that a compound planetary gear train replaces the epicyclic gear train and the positive pistons together with their cylinders and sleeve valves are identical to the corresponding negative pistons 19, sleeve valves 18 and cylinders 17.

Rigidly secured to the sleeve 71, to which the wobbler 62 is fast, is a gear 90 which is the reaction gear of the train. Beyond this gear and rigidly secured to the input shaft 11 is a driving gear 91. Gears 90 and 91 mesh respectively with a series of pairs of planet pinions 92 and 93, the pinions of each pair being integral and revoluble on a pin or shaft 94 secured to an annular flange 95 of a hub or shaft section 96 drivingly connected with the driven shaft through a dog clutch as in the previous embodiment. Since gear 91 is twice as large as planet pinion 93 the ratio between these two gears will be two to one. The ratio between pinion gear 92 and reaction gear 90 is one to one since these gears are the same size. Hence, in neutral the gear 90 and sleeve 71 will rotate at twice the speed of rotation of the drive shaft 11 and therefore the wobbler 62 will produce one reciprocatory cycle of the positive pistons during each revolution of the pump housing. In like manner the non-rotatable adjustable wobbler 31 will produce one reciprocatory cycle of the negative pistons during each revolution of the housing.

As in the case of the preceding embodiment the partition wall 14 within the pump housing, see Fig. 7, is bored to receive the negative and positive cylinders within which the sleeve valves rotate. In the present embodiment the positive cylinders are designated as 122, the sleeve valves therein as 123 and the positive pistons within the sleeve valves as 124. The porting construction is the same as previously described and in fact the construction in respect to the positive and negative pistons, their cylinders, sleeve valves and porting construction are identical with the preceding embodiment excepting that the two sets are identical in size in the embodiment of Figs. 6 and 7. It will also be understood that all ports in this embodiment have the same effective areas as the areas of the piston heads. Since no other differences appear in the two embodiments shown herein a further detailed description of the embodiment of Figs. 6 and 7 is not deemed necessary.

From the foregoing it will be seen that the driving or input shaft 11, the planet pinion carrier 75 and the planet pinions 73, in the embodiment of Figs. 1 and 2 may be considered to be the driving element of the transmission. In the embodiment of Fig. 6 the corresponding component parts of the driving element may be considered to be the input shaft 11, the gear 91 and the planet pinions 92, 93. The reaction gear 72 in Fig. 2 corresponds in function to the reaction gear 90 in Fig. 6 while the internal gear 76 in Fig. 2 corresponds in function to the planet disk carrier or hub flange 95 in Fig. 6. With this understanding a description of the operation of the transmission of Figs. 1 and 2 will largely suffice for the embodiment of Fig. 6.

When the transmission is in neutral the adjustable wobbler unit 31 will be positioned as shown in Fig. 1 or Fig. 6 with the axis of the wobbler unit parallel to broken line 100 passing through the fulcrum point 44. Since the pump housing 13 is rigidly secured to the input or driving shaft 11, this housing will rotate as a unit with the input shaft and will impart corresponding rotative motion to the wobbler element 29 to which the negative pistons 19 are connected. Thus, during rotation of the pump housing the negative pistons will reciprocate within the sleeve valves 18. These sleeve valves, being rotated through the medium of the gearing 85, 86, will be so timed in operation as to cause the pistons to draw oil from the outer chamber 16 of the pump housing during the suction strokes of the pistons and to discharge this oil into the inner chamber 15 during the compression strokes of the pistons.

It will be understood that when the transmission is in neutral, the internal gear 76, which is the driven gear connected to the driven or output shaft 79 by the dog clutch 80, will be stationary thereby causing the planet pinions 73, which are the driving gears, to rotate on their own axes thereby rotating the sun or reaction gear 72 at three times the speed of the driving or input shaft. Since the sun gear is fixed to the sleeve 71 which in turn is integral with the fixed angle wobbler member 62, this member will rotate at three times the speed of the driving shaft. As a result the positive pistons 24 will complete two reciprocatory cycles while the driving shaft and housing 13 complete one revolution. Thus, in the neutral position the total displacement of the negative pistons 19 will be exactly equal to that of the positive pistons 24 during one revolution of the pump housing and two revolutions of the fixed angle wobbler. The sleeve valves 23, within which the positive pistons reciprocate, are driven by the gearing 87, 88 which are timed to cause these pistons during their suction stroke to draw oil out of the inner low pressure chamber 15 and discharge it into the outer high pressure chamber 16. From the foregoing, therefore, it will be seen that with the transmission in neutral the respective pump elements will freely circulate the oil from the inner chamber to the outer chamber and thence back into the inner chamber without resistance and the driven shaft will remain idle without rotating.

During operation of the piston elements a certain quantity of the oil will be directed through a circulatory path distinct from the flow between the inner and outer chambers induced by the pumping elements. The gear pump 55 will continuously draw oil from the sump 57 through intake pipe 56 and force it through the axial passage 51 in the input shaft. This oil is discharged through ducts 53 into the inner chamber 15. During rotation of the pump housing a certain quantity of this oil will at all times discharge through the passages controlled by the check valves 89 and thence return to the sump 57. These valves will open under pressure caused by the inertia of the body of oil within the chamber 15 and centrifugal force acting thereon. This construction is of importance in providing means for effectively cooling the oil and dissipating heat generated within the pump housing by the operation of the pumping elements.

From the neutral position driving torque may be transmitted to the output shaft by turning the control shaft 45 to rotate the wobbler member 31 about its fulcrum 44 to the right in Fig. 1 or Fig. 6. This results in shortening the stroke and thereby reducing the displacement of the pistons 19 so that the total displacement thereof will be less than twice the displacement of the smaller pistons 24 or less than the normal displacement of the pistons 124 in the embodiment of Fig. 6. This reduction in the displacement of the negative pistons renders it impossible for the positive pistons to complete their normal reciprocatory cycles while the negative pistons are making one complete cycle. As a consequence, the fixed angle wobbler member 62 and the reaction gear must slow down in direct proportion to the amount the displacement of the negative pistons has been reduced. This slowing down of the sun or reaction gear 72 causes the planet pinions 73 to slow down in their rotation about their own axes, thereby causing the driven or internal gear 76 to rotate in direct proportion to the amount the sun gear has slowed down and in the same direction as the driving shaft. As the wobbler member 31 is moved towards its position perpendicular to the input shaft, indicated by the line 101 in Fig. 1, the speed ratio between the input and output shafts will be progressively decreased so that when the wobbler unit 31 reaches the perpendicular position, shown by line 101, a one to one ratio or direct drive between the input and output shafts will be obtained. Thus, the further the adjustable wobbler is moved toward the perpendicular line 101 the more the displacement of the negative pistons will be reduced which will be accompanied by a corresponding slowing down of the reciprocation of the positive pistons since the effective displacement of these pistons at all times balances the effective displacement of the negative pistons. This action produces a corresponding slowing down of the sun gear and a speeding up of the internal gear. When the wobbler member 31 is in its perpendicular position the stroke and, therefore, the displacement of the negative pistons will be zero, and correspondingly the stroke and displacement of the positive pistons will be zero. Under this condition the sun or reaction gear 72 will rotate at the driving shaft speed, the planet pinions will cease rotating about their own axes, and the internal gear 76 will rotate at the speed of the driving shaft. At this time a direct straight through drive at a one to one ratio between the input and output shafts will be obtained and the transmission will be immobilized. When thus immobilized the pistons of both sets will be inactive and they, together with the wobbler element 29, wobbler assembly 62, 63 and the entire gear train will rotate bodily as a unit with the pump housing. In direct drive, therefore, the gearing will be immobilized with no relative motion between any of the gear elements.

If the adjustable wobbler member 31 is moved to the right in Fig. 1 past the perpendicular position toward the position shown by the line 102, the valve timing remaining the same, an overdrive condition of the transmission results. At this time, with top and bottom centers of the wobbler member reversed, the circulatory path of the oil induced by the pump elements will be reversed. The negative pistons 19 will draw oil from the inner chamber 15 and discharge it into the outer chamber 16, thus causing the positive pistons 24 to draw oil out of the outer chamber and discharge it into the inner chamber 15. As a result of this operation the fixed angle wobbler 62 and the sun or reaction gear will rotate slower than the driving shaft thereby causing the planet pinions to rotate on their own axes but in the opposite direction to their direction of rotation in forward drive. This will produce a faster rotation of the internal gear 76 than the rotation of the driving shaft resulting in an overdrive condition, namely, a greater speed of rotation of the driven shaft than the speed of rotation of the driving shaft. The transmission may be placed in overdrive by rotating the control shaft 45 to move the adjustable wobbler member 31 to the right of its perpendicular position. On the other hand, with the transmission in direct drive and the control shaft 45 unrestrained the wobbler member 31 will automatically move into the overdrive position under conditions in which the vehicle tends to drive the engine or its speed, such as when coasting, exceeds the speed of the input shaft.

Assuming the wobbler member 31 is at the neutral position indicated by the line 100 in Fig. 1 and reverse drive is desired, the control shaft is operated to swing the wobbler member to the left in Fig. 1 to increase its angle as indicated by the line 103 in Fig. 1. This will result in increasing the stroke and displacement of the negative pistons 19 thereby causing the positive pistons to increase their reciprocatory cycle. In other words this increase of the stroke and displacement of the negative pistons will increase the speed of reciprocation of the positive pistons beyond their speed of reciprocation in neutral. This causes the fixed angle wobbler 62 and the sun gear 72 to speed up, thereby rotating the planet pinions faster on their own axes. This operation of the planet pinions will produce a rotation of the internal gear 76 in a backward direction or opposite to the direction of rotation of the driving shaft. It will be understood that when the transmission is in reverse as well as in forward drive and overdrive, the gear ratio will at all times be proportionate to the change in displacement ratio of the pump elements.

It is important to note that the adjustable wobbler unit 29, 31 is fulcrumed at 44 eccentrically with respect to the axis of the input shaft. As a result this wobbler member is at all times biased toward its neutral position since in all angular positions thereof, whether in reverse or forward drive, the reaction effort of the positive pistons tends to swing the wobbler member to the neutral position. Thus, if the wobbler member 31 is unrestrained and is not held in adjusted position off neutral, such as by relaxing turning effort on the control shaft 45, it will rapidly and smoothly revert to the neutral position. If turning effort on the control shaft is released when the adjustable wobbler is in direct drive the first tendency of the wobbler member will be to swing to the overdrive position. However, when the output shaft slows down to driving shaft speed the adjustable wobbler will rapidly revert to the neutral position unless restrained at any intermediate point. The control shaft is turned through the medium of pressure applied to the vehicle accelerator pedal and intervening control mechanism responsive to the torque reaction transmitted through the hydraulic pump.

It will be noted that when the wobbler member 31 is in neutral position a free neutral condition of the transmission with the input and output shafts disconnected is not provided. Such a free neutral condition may be obtained, such as when it is desired to tow the vehicle, by disengaging the dog clutch member 80 from the hub 76a of the internal gear 76. When this clutch is thus disengaged the input shaft connected to the driving wheels of the vehicle will be rotatable freely and independently of the input shaft and without moving the elements of the hydraulic pump device. It will be seen that the reciprocating pump elements provide a positive means for controlling the characteristics of the set of constantly meshing planetary gears either in the embodiment of Figs. 1 and 2 or the embodiment of Fig. 6. The hydraulic pump mechanism is not, however, a driving means or a coupling means between the input and output shafts but, on the other hand, a means by which torque multiplication may be achieved between the input and output shafts and through the medium of which the torque reaction, which is at all times directly proportional to the load on the input shaft, may be transmitted to the fixed or stationary transmission case.

It will be understood that the lines 100, 101, 102 and 103 in Fig. 1 designating the neutral, direct drive, overdrive and reverse drive positions of the adjustable wobbler member are merely schematic to represent approximate relative angular positions. The entire range of angular movement of the wobbler may in actual practice be smaller or even larger, depending upon the design and construction of the transmission and the size of the component parts of the pump. Hence, these lines inserted to indicate angular positions are purely arbitrary and for illustrative purposes and the wobbler assembly will of course be mounted and located with respect to the pump housing so as to permit whatever range of angular adjustment as will be necessary to attain the various drives and speeds required either forwardly or in reverse.

I claim:

1. In a variable speed transmission having input and output shafts, a housing secured to said input shaft for rotation therewith and divided into two chambers adapted to contain a non-compressible fluid medium, means for pumping said fluid from one chamber into the other chamber, a second means for pumping said fluid from the latter chamber into the first chamber, an angularly adjustable wobbler member for controlling the displacement of said first pumping means, a wobbler member set at a constant angle connected to said second pumping means, and a gear train including a reaction gear secured to the second wobbler member, gear means drivingly connected to the input shaft, and gear means drivingly connected to the output shaft, one of said gear means including planet pinions operatively connecting the reaction gear and said other gear means.

2. In a variable speed transmission having input and output shafts, a housing secured to said input shaft for rotation therewith and divided into two chambers adapted to contain a non-compressible fluid medium, means for pumping said fluid from one chamber into the other chamber, a second means for pumping said fluid from the latter chamber into the first chamber, an angularly adjustable wobbler member for controlling the displacement of said first pumping means, a wobbler member set at a constant angle connected to said second pumping means, and a set of constantly meshing planetary gears connecting the second wobbler member and said shafts, said wobbler members being mounted at opposite sides of said housing and at the same side of said gears.

3. In a variable speed transmission having input and output shafts, a housing secured to said input shaft for rotation therewith and divided into two chambers adapted to contain a non-compressible fluid medium, means for pumping said fluid from one chamber into the other chamber, a second means for pumping said fluid from the latter chamber into the first chamber, an angularly adjustable wobbler member for controlling the displacement of said first pumping means, a wobbler member set at a constant angle connected to said second pumping means, and a set of constantly meshing planetary gears connecting the second wobbler member and said shafts, said second wobbler member being interposed between the housing and said reaction gear.

4. In a variable speed transmission having input and output shafts, a housing secured to said input shaft for rotation therewith and divided into two chambers adapted to contain a non-compressible fluid medium, means for pumping said fluid from one chamber into the other chamber, a second means for pumping said fluid from the latter chamber into the first chamber, an angularly adjustable wobbler member for controlling the displacement of said first pumping means, a wobbler member set at a constant angle connected to said second pumping means, a gear train including a reaction gear secured to the second wobbler member, a gear fixed to the input shaft, and planet pinions connecting said gears and said output shaft, said gear train providing normally a two to one speed ratio between the reaction gear and input shaft.

5. In a variable speed transmission having input and output shafts, a housing secured to said input shaft for rotation therewith and divided into two chambers adapted to contain a non-compressible fluid medium, means for pumping said fluid from one chamber into the other chamber, a second means for pumping said fluid from the latter chamber into the first chamber, an angularly adjustable wobbler member for controlling the displacement of said first pumping means, a wobbler member set at a constant angle connected to said second pumping means, and a set of constantly meshing epicyclic gears connecting the second wobbler member and said shafts and providing normally a three to one speed ratio between the second wobbler member and input shaft.

6. In a variable speed torque multiplying transmission having input and output shafts, a variable angle wobbler unit including a rotatable element and a non-rotatable element, hydraulic pump mechanism operated by one of said elements, a fixed angle wobbler unit including a support element and an element rotatable relative thereto, hydraulic pump mechanism operated by one of said last two elements, a constantly meshing set of gears connected to the input and output shafts and including a reaction gear secured to one of said two last named elements, and a pump housing enclosing both of said pump mechanisms and interposed entirely between said wobbler units.

7. In a variable speed torque multiplying transmission having input and output shafts, a variable angle wobbler unit including a rotatable element and a non-rotatable element, hydraulic pump mechanism operated by one of said elements, a fixed angle wobbler unit including a support element and an element rotatable relative thereto, hydraulic pump mechanism operated by one of said last two elements, a constantly meshing set of gears connected to said shafts and including a reaction gear secured to one of said two last named elements, a pump housing enclosing both of said pump mechanisms and interposed entirely between said wobbler units, and stationary means connected to said variable angle wobbler unit for absorbing the torque reaction transmitted thereto.

8. In a variable speed transmission having input and output shafts, a variable angle wobbler unit embracing said input shaft and including a non-rotatable element and an element rotatable with the input shaft, means eccentrically mounted with respect to said input shaft for restraining rotation of said non-rotatable element, hydraulic pump mechanism operated by one of said elements, a set of constantly meshing gears connected to said shafts and including a reaction gear, a fixed angle wobbler unit including two elements one rotatable relatively to the other and one secured to the reaction gear, hydraulic pump mechanism operated by the other of said last two elements, a housing enclosing both pump mechanism and interposed between the wobbler units, and means for transmitting the torque reaction from the fixed angle wobbler unit to a fixed point.

9. In a variable speed transmission having input and output shafts, a variable angle wobbler unit including a non-rotatable element and an element rotatable with the input shaft, hydraulic pump mechanism operated by one of said elements, a set of constantly meshing gears connected to said shafts and including a reaction gear, a fixed angle wobbler unit including two elements one rotatable relatively to the other and one secured to the reaction gear, hydraulic pump mechanism operated by the other of said last two elements, a housing enclosing both pump mechanism and interposed between the wobbler units, said housing being divided into two chambers, and valve mechanism between the chambers to control the discharge of fluid by each pump mechanism from one chamber into the other but one reversely to the other.

10. In a variable speed transmission having input and output shafts, a variable angle wobbler unit including a non-rotatable element and an element rotatable with the input shaft, hydraulic pump mechanism operated by one of said elements, a set of constantly meshing gears connected to said shafts and including a reaction gear, a fixed angle wobbler unit including two elements one rotatable relatively to the other and one secured to the reaction gear, hydraulic pump mechanism operated by the other of said last two elements, a housing enclosing both pump mechanisms and interposed between the wobbler units, said housing being secured for rotation to the input shaft, and a support for said transmission to which said variable angle wobbler unit is connected for transmitting torque reaction thereto.

11. In a variable speed transmission having input and output shafts, a variable angle wobbler unit, means for mounting said wobbler unit to swing about an axis spaced from the axis of rotation of said input shaft, a fixed angle wobbler unit, a gear train connected to the input and output shafts and including a reaction gear secured to the fixed angle wobbler unit, and a hydraulic pump unit including two sets of displacement elements, one set connected to one wobbler unit and the other set connected to the other wobbler unit.

12. In a variable speed transmission having input and output shafts, a variable angle wobbler unit, means for mounting said wobbler unit to swing about an axis spaced from the axis of rotation of said input shaft, a fixed angle wobbler unit, a gear train connected to the input and output shafts and including a reaction gear secured to the fixed angle wobbler unit, and a hydraulic pump unit interposed between said wobbler units including two sets of displacement elements, one set connected to one wobbler unit and the other set connected to the other wobbler unit.

13. In a variable speed transmission having input and output shafts, a variable angle wobbler unit, means for mounting said wobbler unit to swing about an axis spaced from the axis of rotation of said input shaft, a fixed angle wobbler unit, a gear train connected to the input and output shafts and including a reaction gear secured to the fixed angle wobbler unit, and a hydraulic piston pump unit including two sets of reciprocating displacement elements, one set connected to one wobbler unit and the other set connected to the other wobbler unit.

14. In a variable speed transmission having input and output shafts, a variable angle wobbler unit, means for mounting said wobbler unit to swing about an axis spaced from the axis of rotation of said input shaft, a fixed angle wobbler unit, a gear train connected to the input and output shafts and including a reaction gear secured to the fixed angle wobbler unit, and a hydraulic pump unit drivingly connected to the input shaft and including two sets of displacement elements, one set connected to one wobbler unit and the other set connected to the other wobbler unit.

15. In a variable speed transmission, a fixed support, an input shaft and an output shaft aligned therewith, a variable angle wobbler unit embracing the input shaft, means for fulcruming said wobbler unit on said support at a point spaced from the axis of rotation of the input shaft, a fixed angle wobbler unit, a set of meshing gears drivingly connected to the input and output shafts and including a reaction gear secured to said last named wobbler unit, and hydraulic pump mechanism including two sets of displacement elements connected respectively to the variable angle and fixed angle wobbler units.

16. In a variable speed transmission, a fixed support, an input shaft and an output shaft aligned therewith, a variable angle wobbler unit embracing the input shaft, means for fulcruming said wobbler unit on said support at a point spaced from the axis of rotation of the input shaft, a fixed angle wobbler unit, a set of meshing gears drivingly connected to the input and output shafts and including a reaction gear secured to said last named wobbler unit, hydraulic pump mechanism including alternating displacement elements connected respectively to the variable angle and fixed angle wobbler units, and means for disconnecting said first named gear from the output shaft.

17. In a variable speed transmission, a fixed support, an input shaft and an output shaft aligned therewith, a variable angle wobbler unit embracing the input shaft, means for fulcruming said wobbler unit on said support at a point spaced from the axis of rotation of the input shaft, a fixed angle wobbler unit, a set of meshing gears drivingly connected to the input and output shafts and including a reaction gear secured to said last named wobbler unit, and hydraulic pump mechanism rotatable with the input shaft and including alternating displacement elements connected respectively to the variable angle and fixed angle wobbler units.

18. In a variable speed transmission having aligned input and output shafts, a cylindrical pump housing secured to the input shaft coaxially therewith, an even series of annularly arranged reciprocating displacement elements within the housing, said housing having two chambers, valve means for controlling the discharge of fluid by one set of alternate elements from one chamber into the other, valve means for controlling the discharge of fluid by the other set of alternate elements from the latter chamber into the first chamber, wobbler mechanism connected to each set of displacement elements, and gear mechanism connecting one wobbler mechanism with the input and output shafts.

19. In a variable speed transmission having aligned input and output shafts, a cylindrical pump housing secured to the input shaft coaxially therewith, an even series of annularly arranged reciprocating displacement elements within the housing, said housing having two chambers, valve means for controlling the discharge of fluid by one set of alternate elements from one chamber into the other, valve means for controlling the discharge of fluid by the other set of alternate elements from the latter chamber into the first chamber, wobbler mechanism connected to each set of displacement elements, gear mechanism connecting one wobbler mechanism with the input and output shafts, and means for angularly adjusting the other wobbler mechanism.

20. In a variable speed transmission having aligned input and output shafts, a cylindrical pump housing secured to the input shaft coaxially therewith, an even series of annularly arranged reciprocating displacement elements within the housing, said housing having two chambers, valve means for controlling the discharge of fluid by one set of alternate elements from one chamber into the other, valve means for controlling the discharge of fluid by the other set of alternate elements from the latter chamber into the first chamber, wobbler mechanism connected to each set of displacement elements, gear mechanism connecting one wobbler mechanism with the input and output shafts, and means for angularly adjusting the other wobbler mechanism about an axis eccentric with respect to the input shaft.

21. In a variable speed transmission having input and output shafts, a fixed support, a wobbler unit pivotally connected to the support for the transmission of torque reaction thereto, a set of constantly meshing gears including a reaction gear free on the input shaft, a gear secured to the input shaft, and planet pinions meshing with said gears and connected to the output shaft, a pump housing having an annular partition dividing the housing into inner and outer chambers, said housing being secured for rotation to the input shaft, a second wobbler unit secured for rotation to the reaction gear, a series of cylinders in said partition, a set of pistons connected to each wobbler unit and reciprocable in said cylinders, and valve mechanism for controlling the displacement of each set of pistons whereby one set will pump fluid from the inner chamber into the outer chamber while the other set pumps fluid from the outer chamber into the inner chamber.

22. In a variable speed transmission having input and output shafts, a fixed support, a wobbler unit pivotally connected to the support for the transmission of torque reaction thereto, a set of constantly meshing gears including a reaction gear free on the input shaft, a gear secured to the input shaft, and planet pinions meshing with said gears and connected to the output shaft, a pump housing having an annular partition dividing the housing into inner and outer chambers, said housing being secured for rotation to the input shaft, a second wobbler unit secured for rotation to the reaction gear, a series of cylinders in said partition, a set of pistons connected to each wobbler unit and reciprocable in said cylinders, the pistons and cylinders of one set being arranged alternately with respect to the other set, and valve mechanism for controlling the displacement of each set of pistons whereby one set will pump fluid from the inner chamber into the outer chamber while the other set pumps fluid from the outer chamber into the inner chamber.

23. In a variable speed transmission having input and output shafts, a fixed support, a wobbler unit pivotally connected to the support for the transmission of torque reaction thereto, said pivotal connection being eccentric to the input shaft axis, a set of constantly meshing gears including a reaction gear free on the input shaft, a gear secured to the input shaft, and planet pinions meshing with said gears and connected to the output shaft, a pump housing having an annular partition dividing the housing into inner and outer chambers, said housing being secured for rotation to the input shaft, a second wobbler unit secured for rotation to the reaction gear, a series of cylinders in said partition, a set of pistons connected to each wobbler unit and reciprocable in said cylinders, and valve mechanism for controlling the displacement of each set of pistons whereby one set will pump fluid from the inner chamber into the outer chamber while the other set pumps fluid from the outer chamber into the inner chamber.

24. In a variable speed transmission having input and output shafts, a fixed support, a wobbler unit pivotally connected to the support for the transmission of torque reaction thereto, a set of constantly meshing gears drivingly connected to the input and output shafts and including a reaction gear free on the input shaft, a pump housing having an annular partition dividing the housing into inner and outer chambers, said housing being secured for rotation to the input shaft, a second wobbler unit secured for rotation to the reaction gear, a series of cylinders in said partition, a set of pistons connected to each wobbler unit and reciprocable in said cylinders, and valve mechanism for controlling the displacement of each set of pistons whereby one set will pump fluid from the inner chamber into the outer chamber while the other set pumps fluid from the outer chamber into the inner chamber.

25. In a variable speed transmission having input and output shafts, a pump housing divided into separate inner and outer chambers, a set of displacement pump elements within the housing operative in common for pumping fluid from the inner chamber into the outer chamber, a second set of displacement pump elements within the housing operative in common for pumping fluid from the outer chamber into the inner chamber, a pump for pumping fluid through a passage in the input shaft into the inner chamber, a valved passage for permitting discharge of fluid out of the inner chamber independently of the outer chamber, means connected to the first set of elements for varying the displacement thereof, and means including a set of gears drivingly connected to the input and output shafts and also connected to the second set of displacement elements for varying the speed ratio of the output shaft with respect to the input shaft.

26. In a variable speed transmission having input and output shafts, a pump housing divided into separate inner and outer chambers, a set of displacement pump elements within the housing operative in common for pumping fluid from the inner chamber into the outer chamber, a second set of displacement pump elements within the housing operative in common for pumping fluid from the outer chamber into the inner chamber, a pump for pumping fluid through a passage in the input shaft into the inner chamber, a valved passage for permitting discharge of fluid out of the inner chamber independently of the outer chamber, means including a variable angle wobbler unit connected to the first set of elements for varying the displacement thereof, and means including a fixed angle wobbler unit and a set of gears drivingly connected to the input and output shafts and also connected to the second set of displacement elements for varying the speed ratio of the output shaft with respect to the input shaft.

27. In a variable speed transmission having input and output shafts, a pump housing divided into separate inner and outer chambers and secured to the input shaft, a set of displacement pump elements within the housing operative in common for pumping fluid from the inner chamber into the outer chamber, a second set of displacement pump elements within the housing operative in common for pumping fluid from the outer chamber into the inner chamber, a pump for pumping fluid through a passage in the input shaft into the inner chamber, a valved passage for permitting discharge of fluid out of the inner chamber independently of the outer chamber, means connected to the first set of elements for varying the displacement thereof, and means including a set of gears drivingly connected to the input and output shafts and also connected to the second set of displacement elements for varying the speed ratio of the output shaft with respect to the input shaft.

28. In a variable speed transmission having aligned input and output shafts, a pump housing rotatable with the input shaft and having two separate chambers, a series of reciprocating equal displacement pump elements in said housing, one set of said elements pumping liquid from one chamber into the other and a second set of equal number pumping liquid from the other chamber into the first chamber, means for varying the displacement of said one set of pump elements, a set of constantly meshing gears drivingly connected to the input and output shafts, and including a reaction gear free of the input shaft, and means for connecting said reaction gear to said second set of pump elements.

29. In a variable speed transmission having aligned input and output shafts, a pump housing rotatable with the input shaft and having two separate chambers, a series of reciprocating equal displacement pump elements in said housing, one set of said elements pumping liquid from one chamber into the other and a second set of equal number pumping liquid from the other chamber into the first chamber, means for varying the displacement of said one set of pump elements, a set of constantly meshing gears drivingly connected to the input and output shafts and including a reaction gear free of the input shaft, and means for connecting said reaction gear to said second set of pump elements, said housing having an annular wall structure forming a partition separating said chambers and said pump elements being carried by said wall structure.

30. In a variable speed transmission having aligned input and output shafts, a pump housing rotatable with the input shaft and having two separate chambers, a series of reciprocating pump elements in said housing, one set of said elements pumping liquid from one chamber into the other and a second set of equal number pumping liquid from the other chamber into the first chamber, means for varying the displacement of said one set of pump elements, a set of constantly meshing gears drivingly connected to the input and output shafts and including a reaction gear free of the input shaft, and means for connecting said reaction gear to said second set of pump elements.

31. In a variable speed transmission having input and output shafts, a pump housing secured to and rotatable with the input shaft, said pump housing having inner and outer chambers spaced apart transversely of the input shaft, a set of pumping cylinders and reciprocating pumping elements therein for normally pumping liquid from the inner chamber into the outer chamber, a second set of pumping cylinders and reciprocating pumping elements therein for normally pumping liquid from the outer chamber into the inner chamber and valve means for alternatively establishing communication between said cylinders and the inner and outer chambers.

32. In a variable speed transmission having input and output shafts, a pump housing secured to and rotatable with the input shaft, said pump housing having inner and outer chambers, a set of pumping elements for normally pumping liquid from the inner chamber into the outer chamber, a second set of pumping elements for normally pumping liquid from the outer chamber into the inner chamber, and rotatable sleeve valves receiving said pumping elements and provided with ports corresponding in effective areas to the displacement areas of said pumping elements alternately providing communication between said chambers and sleeve valves.

33. In a variable speed transmission having input and output shafts, a pump housing secured to and rotatable with the input shaft, said pump housing having inner and outer chambers, a set of piston pumping elements for normally pumping liquid from the inner chamber into the outer chamber, a second set of piston pumping elements for normally pumping liquid from the outer chamber into the inner chamber, and rotatable sleeve valves receiving said pumping elements and provided with ports corresponding in effective areas to the displacement areas of said pumping elements alternately providing communication between said chambers and sleeve valves.

34. In a variable speed transmission having input and output shafts, a pump housing secured to and rotatable with the input shaft, said pump housing having inner and outer chambers, a set of piston pumping elements for normally pumping liquid from the inner chamber into the outer chamber, a second set of piston pumping elements for normally pumping liquid from the outer chamber into the inner chamber, rotatable sleeve valves receiving said piston elements, cylinders receiving said sleeve valves, each sleeve valve having a port adapted to register during rotation with diametrically opposed ports in a cylinder to alternately establish communication between said chambers and cylinder, and said ports in each cooperating sleeve valve and cylinder having equal effective areas.

35. In a variable speed transmission having input and output shafts, a pump housing secured to and rotatable with the input shaft, said pump housing having inner and outer chambers, a set of piston pumping elements for normally pumping liquid from the inner chamber into the outer chamber, a second set of piston pumping elements for normally pumping liquid from the outer chamber into the inner chamber, rotatable sleeve valves receiving said piston elements, cylinders receiving said sleeve valves, each sleeve valve having a port adapted to register during rotation with diametrically opposed ports in a cylinder to alternately establish communication between said chambers and cylinder, and said ports in each cooperating sleeve valve and cylinder having equal effective areas corresponding to the displacement area of the piston element associated therewith.

36. In a variable speed transmission having input and output shafts, a pump housing secured to and rotatable with the input shaft, said pump housing having inner and outer chambers spaced apart transversely of the input shaft, a set of pumping elements for normally pumping liquid from the inner chamber into the outer chamber, a second set of pumping elements for normally pumping liquid from the outer chamber into the inner chamber, pumping chambers receiving said elements, valved ports alternately providing communication between said inner chamber and the pumping chambers and then between the pumping chambers and the outer chamber, and means for causing said sets of pumping elements to pump liquid in the reverse manner from one chamber to the other.

37. In a variable speed transmission having input and output shafts, a pump housing secured to and rotatable with the input shaft and having two chambers separated by valved ports, said chambers comprising an inner chamber surrounding the input shaft and an outer chamber surrounding the inner chamber, two sets of pumping elements, and control means for causing either set of pumping elements to pump liquid from either chamber to the other.

38. In a variable speed transmission having input and output shafts, a pump housing secured to and rotatable with the input shaft and having two chambers separated by valved ports, two sets of pumping elements arranged alternately around said input shaft, and control means for causing either set of pumping elements to pump liquid from either chamber to the other, said control means including an angularly adjustable wobbler member.

39. In a variable speed transmission having input and output shafts, a pump housing secured to and rotatable with the input shaft and having two chambers separated by valved ports, two sets of pumping elements, and control means for causing either set of pumping elements to pump liquid from either chamber to the other, said control means including an unbalanced angularly adjustable wobbler.

40. In a variable speed transmission having input and output shafts, a pump housing secured to and rotatable with the input shaft and having two chambers separated by valved ports, said chambers comprising an inner chamber surrounding the input shaft and an outer chamber surrounding the inner chamber, two sets of pumping elements, and control means for causing one set of pumping elements to pump liquid from one chamber to the other and the other set to pump liquid from the other chamber to the first chamber and vice versa.

41. In a variable speed transmission having input and output shafts, a pump housing secured to and rotatable with the input shaft and having two chambers separated by valved ports, said chambers comprising an inner chamber surrounding the input shaft and an outer chamber surrounding the inner chamber, two sets of pumping elements, control means for causing one set of pumping elements to pump liquid from one chamber to the other and the other set to pump liquid from the other chamber to the first chamber, means for inducing a flow of liquid through the input shaft to one of said chambers, and valve means for permitting the discharge of liquid from said last named chamber independently of the other chamber.

HELMUTH A. MEINECKE.

REFERENCES CITED

The following references are of record in the file of this patent:

UNITED STATES PATENTS

| Number | Name | Date |
|---|---|---|
| 1,077,454 | Cooke | Nov. 4, 1913 |
| 1,197,789 | Bluemel | Sept. 12, 1916 |
| 1,840,864 | Rayburn et al. | Jan. 12, 1932 |
| 1,840,872 | Rayburn | Jan. 12, 1932 |
| 1,840,873 | Rayburn | Jan. 12, 1932 |
| 1,846,961 | Greening et al. | Feb. 23, 1932 |
| 1,852,335 | Rosen | Apr. 5, 1932 |
| 1,951,345 | Centervall | Mar. 20, 1934 |
| 1,998,922 | Chamberlain | Apr. 23, 1935 |
| 2,017,375 | Robin et al. | Oct. 15, 1935 |
| 2,176,401 | Johns | Oct. 17, 1939 |
| 2,186,556 | Robbins | Jan. 9, 1940 |
| 2,199,081 | Perin | Apr. 30, 1940 |
| 2,218,405 | Orshansky | Oct. 15, 1940 |
| 2,285,431 | Grossenbacher | June 9, 1942 |

FOREIGN PATENTS

| Number | Country | Date |
|---|---|---|
| 370,406 | Great Britain | Oct. 8, 1932 |
| 508,434 | France | July 24, 1920 |